United States Patent [19]

Toldi

[11] Patent Number: 5,269,242
[45] Date of Patent: Dec. 14, 1993

[54] WILD BIRD FEEDER

[76] Inventor: George Toldi, 2775 Glorietta Cir., Santa Clara, Calif. 95051

[21] Appl. No.: 56,622

[22] Filed: May 4, 1993

[51] Int. Cl.⁵ ............................................ A01K 39/00
[52] U.S. Cl. .................................................... 119/52.2
[58] Field of Search ................ 119/52.1, 52.2, 52.3, 119/52.4, 54, 57.8, 57.9

[56] References Cited

U.S. PATENT DOCUMENTS

| 4,977,859 | 12/1990 | Kilham | 119/52.2 |
| 5,062,388 | 11/1991 | Kilham | 119/52.2 |

Primary Examiner—Gene Mancene
Assistant Examiner—Thomas Price
Attorney, Agent, or Firm—Michael J. Hughes

[57] ABSTRACT

A bird feeder (10) for all seasons having a seed reservoir (12) for gravitationally delivering food in pellet or seed form to an inner bell (20) positioned within an outer bell (22). The inner bell (20) and the outer bell (22) rotatably mate with each other and are shaped to provide a closed mode for storage and an open mode for food access. In the open mode the outer bell (22) is rotated so that arch apertures (44) in the inner bell (20) align with inverted arch apertures (66) in the outer bell (22). In the closed mode the arch apertures (44) of the inner bell (20) align with the outer cylindrical wall (54) of the outer bell (22). A damper (24) controls seed flow, and a cover structure (18) with a sloping roof (74) retains the inner bell (20) and outer bell (22) in a rotatable position relative to each other.

19 Claims, 5 Drawing Sheets

WILD BIRD FEEDER

TECHNICAL FIELD

This invention relates generally to devices for feeding animals and more particularly to devices for dispensing seed to birds.

BACKGROUND ART

To the enjoyment of millions of people, birds continue to coexist in nearly all environments with mankind. From the very beginnings of human civilization mankind has been fascinated by, and even revered, these musical, graceful, and colorful animals. Various clubs and societies devote enormous amounts of time observing the varieties of avian life and behavior. From the domestic canary to the wild bird of prey, people enjoy watching and being close to birds.

The metabolism of most birds requires them to consume large amounts of food in proportion to their sizes. Unless a bird is fully domesticated, this vital supply of food is not always readily available, particularly in the colder seasons. Wild birds will move from one area to the next looking for what small morsels they are able to find. Because of this behavior wild birds will, with seeming gratitude, quickly consume food given to them by man. Thus, it takes but a small handful of seed to enjoy the company of birds.

The desire for people to draw birds closer to their homes has led to various feeding devices. These devices range from very simple dispensers to rather complex forms aimed at being more decorative than functional. The majority of bird feeders operate in the same general manner. The devices have a storage chamber with an opening at the bottom. Attached to this bottom opening is a flat base mount with a surrounding wall on its outer edges. The base mount is attached so that gaps exist between the base and chamber. When the storage chamber is filled with seed, gravity forces the seeds out the bottom of the chamber and into the surrounding wall. The wall acts like a dam and stops the flow of seeds. As the seeds are eaten, more seeds continue to flow out of the bottom of the storage chamber until the feeder is empty. These types of feeders are not without drawbacks, however.

The straightforward design of a chamber and a base with surrounding wall does not take into account the manner in which birds eat. When confronted with a trough full of seeds birds will rapidly sweep their beaks from side to side while feeding. Whether the birds are searching for one particular seed, or sweeping aside empty husks resting on the surface, the end result is a shower of seeds falling to the ground. This is both wasteful and messy. In addition, adverse weather can completely empty such feeders in a short amount of time as gravity will continue to force the seeds into the surrounding wall as the wind either blows out the seeds, or tilts the feeder causing the seeds to spill out. If these events occur in cold whether, once the seeds are on the ground the sleet and snow can freeze the seeds making them inaccessible until the ice melts. In addition, wet weather can soak the seeds causing them to mold and disintegrate.

More advanced bird feeder designs provide a limited solution to these problems. One variety of structures consists of a polygon tube structure with a sealed bottom. The walls of the tube structure have side openings, with each opening having a damping structure for stopping the flow of seeds. The damping structure is typically in the shape of an inverted half-dome. These designs alleviate the problem associated with bird feeding habits, but continue to subject the feeder to the elements and thus can be wasteful and messy.

Another type of advanced bird feeder structure which may be found in the prior art are those which consist of "stacked" structures in which a number of funnel type structures are stacked on top of one another with feeding openings available to the sides are circumferentially surrounding each of the funnels. Some of these types of feeders may have as many as eight feeding holes available for use simultaneously. One consequent of the continuous gravity feed structures of this nature is that the number of available feed locations decreases as the supply of seed is depleted. That is, only those locations at the bottom of the gravity well will maintain feed as the supply vanishes from the upper locations.

The proliferation of types of bird feeders and methods for presenting seed to flying animals has resulted in a wide variety of potential structures. However, each variety has advantages and disadvantages in peculiar combinations, and none solve all of the problems associated with providing a secure and desirable feeder for avian creatures. Much room remains for improvement before the "ideal" bird feeder is perfected.

DISCLOSURE OF INVENTION

Accordingly, it is an object of the present invention to provide a bird feeder which protects its contents in adverse weather.

It is another object of the present invention to provide a bird feeder with openings that are easily closed and opened.

It is a further object of the present invention to provide a bird feeder which is easily refillable.

It is still another object of the present invention to provide a bird feeder which retains its uneaten contents despite the feeding habits of birds.

It is a still further object of the invention to provide a feeder which resists tampering and raiding by mammals such as rodents and cats and caters exclusively to flying creatures.

Briefly, the preferred embodiment of the present invention is a wild bird feeder assembly characterized by having an interior feeding tunnel which presents feeding openings to the desired category of birds. In the preferred embodiment, the feeder tunnel is designed to have two end openings which are adapted to be opened and shut quickly and simultaneously for the purposes of protecting the contents against environmental damage, when desired. The feeder assembly includes a seed reservoir, a hanger structure, a feeder body subassembly including an inner bell adapted to mate with an outer bell and an interior tunnel defining damper. In addition, a protective cover fits over the top of the feeder body and a perch structure attaches beneath the feeder body to provide access for the birds to the feeding tunnel.

The feeder assembly is adapted to be utilized with modular watertight seed reservoirs which are available to the user, such as plastic soft drink bottles, which may be threadably mated with the feeder body such that gravity causes the seed to flow downward into the feeder body. The inner bell (upper bell), which forms an upper portion of the feeder body is hollow and mates with both with the outer bell (lower bell) and with the internal damper structure. Both the outer bell and the inner bell are hollow and have openings which can be aligned to form the feeding openings into the internal feeding tunnel which is defined by the damper. The inner bell rotatably nests within the outer bell so that a twisting motion of the bells with respect to one another can cause the feeder openings to be accessible in a feed mode or to be occluded in a storage mode, with the converse being accomplished in a rapid and easy fashion. The entire feeder assembly is generally rotationally symmetrical about a central axis and the outer bell is mounted on the inner bell in such a fashion that it may be rotated without restriction from stops or obstacles, so that it is not necessary to reverse the twisting motion to go between the various modes.

Although the primary environmental protection for the contents of the feeder body is provided by the ability to convert the feeder body to a closed (storage) mode, additional environmental protection is provided by the cover structure. The cover structure is a sloping overhanging roof which also provides rodent and cat protection for the birds and the seeds. The cover also helps to maintain the integrity of the attachment of the outer bell to the inner bell. The perch structure, which depends from the outer bell at the bottom of the feeder body, provides a perching location for the desired avians. The perch is aligned such that convenient access to the feeder tunnel is provided.

An advantage of the present invention is that it is adapted to provide complete protection for the contents in adverse weather.

Another advantage of the present invention is that it provides a bird feeder with openings that are easily closed and opened.

A further advantage of the present invention is that it provides a flying animal feeder which is easily refillable.

Still another advantage of the present invention is that it provides a bird feeder which retains a high percentage of its contents in usable form despite the feeding habits of birds.

A still further advantage of the present invention is that it is adapted to utilize common modular storage components for the seeds, thus permitting rapid and efficient refilling.

These and other objects and advantages of the present invention will become clear to those skilled in the art in view of the description of the best presently known mode of carrying out the invention and the industrial applicability of the preferred embodiment as described herein and as illustrated in the several figures of the drawing.

BEST MODE FOR CARRYING OUT THE INVENTION

The preferred embodiment of the present invention is a wild bird feeder which is adapted to be utilized in both a feeding (or open) mode in which the birds have ready access to the contents and a storage (or closed) mode in which the contents are effectively sealed from the weather. The wild bird feeder assembly is adapted to be easily converted from the open to the closed mode, and back again, without dismounting or disassembling the structure. The feeder assembly is also intended to be attractive and convenient for the use of avian creatures.

Figure 1:
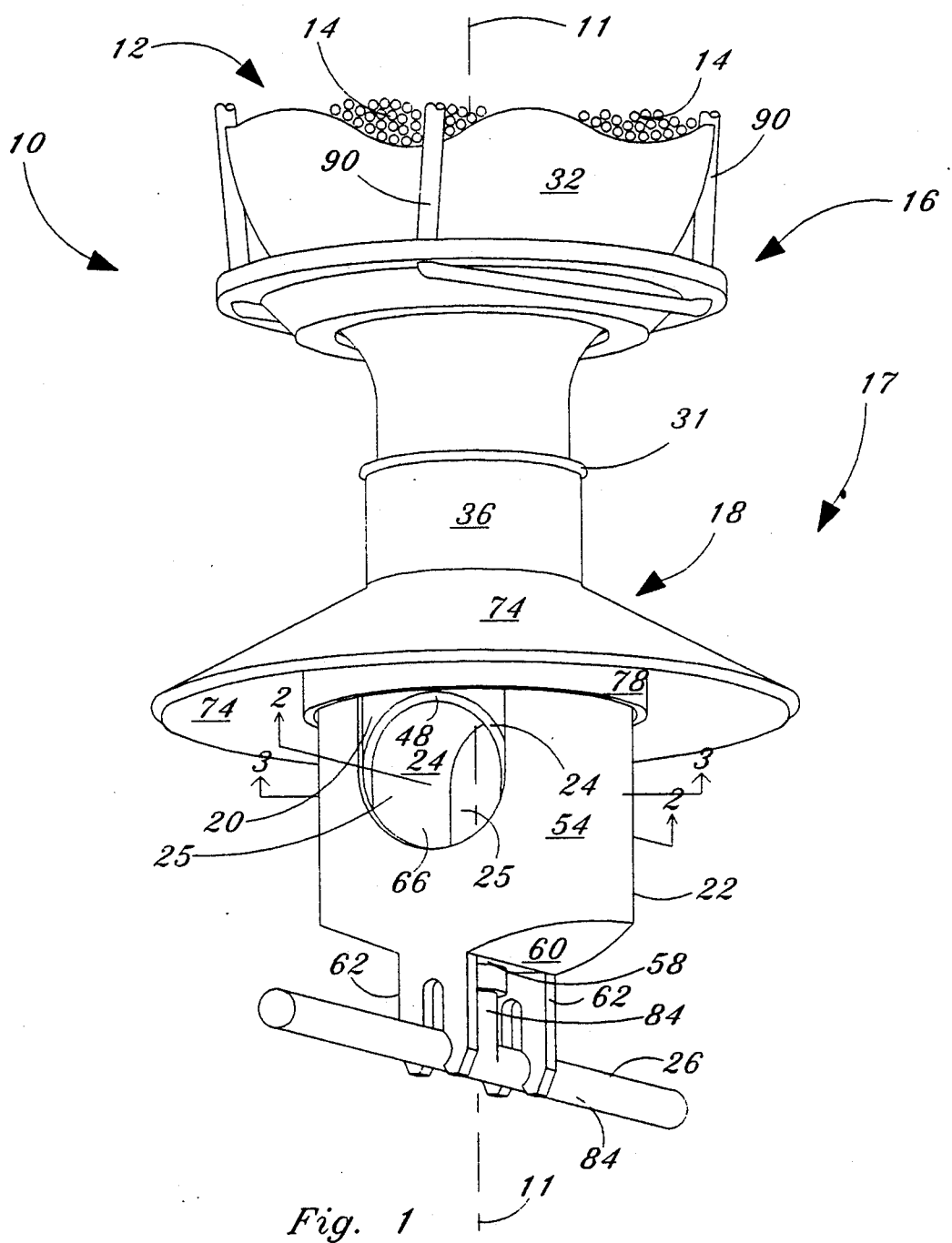
FIG. 1 a perspective view of the preferred embodiment.
Figure 4:
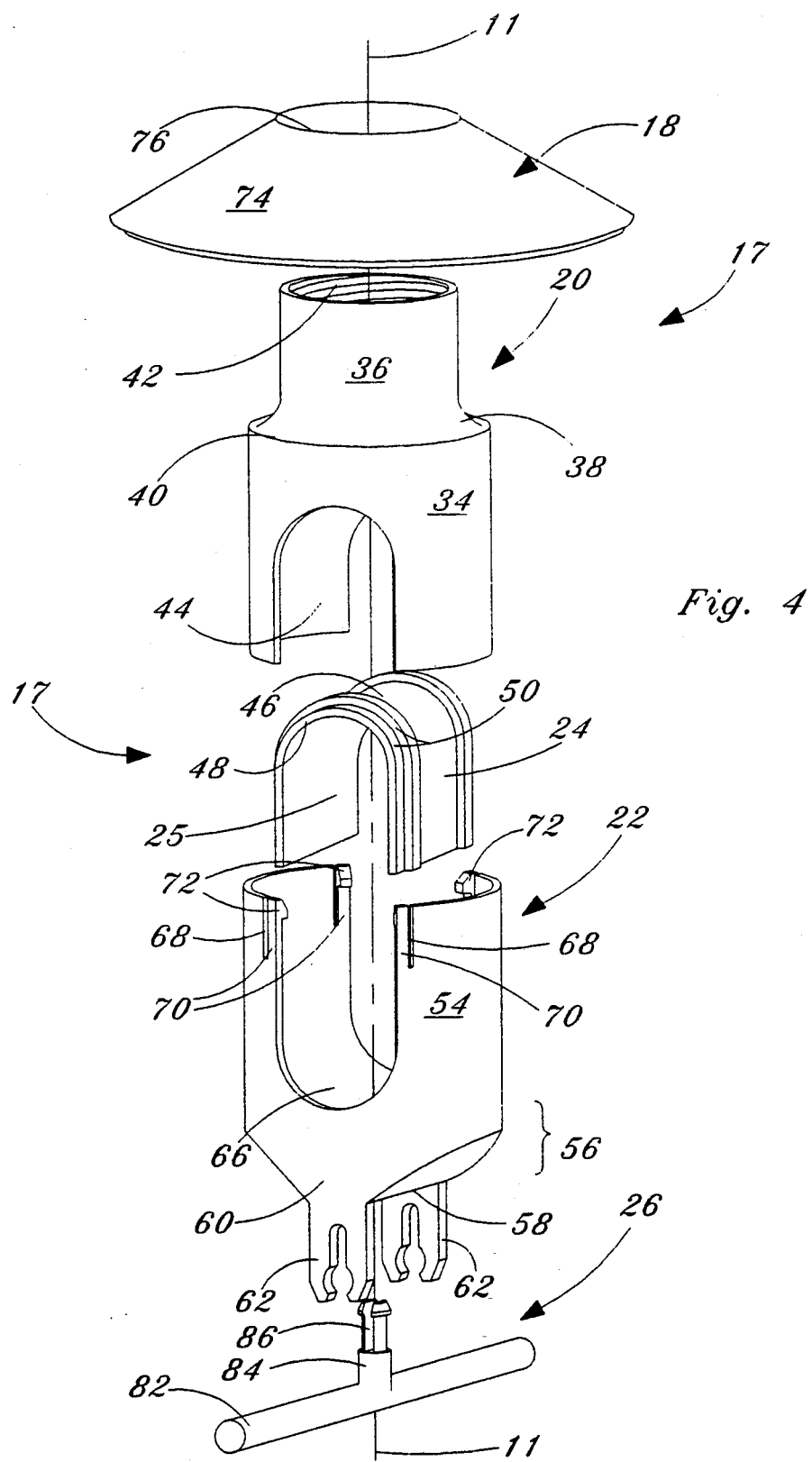
FIG. 4. is a fanciful exploded view of the feeder body subassembly, illustrating the cover, the inner bell, the outer bell, and the damper, and also showing the perching attachment of the preferred embodiment.

The preferred wild bird feeder assembly of the present invention is illustrated in a perspective view in FIG. 1 and is designated by the general reference character 10. As is shown in FIG. 1, and FIG. 4, particularly, the assembly 10 is generally radially symmetrically about a central rotational axis 11.

The bird feeder assembly 10 includes a seed reservoir 12 which is adapted to retain a supply of bird seed 14 or similar pellet-like contents. The seed reservoir 12 is supported by a hanger structure 16 and is connected to a feeder body subassembly 17 in a manner which is watertight.

The feeder body subassembly 17 includes a cover structure 18, an inner bell 20, an outer bell 22 and a damper 24. As is particularly shown in FIGS. 2, 3 and 4, the damper 24 fits within the inner bell 20, which in turn nests within the outer bell 22, and the cover structure 18 fits over the top. The inner bell 20, the outer bell 22 and the damper 24 are constructed and fit together in such a manner as to create a diametrically aligned feeding tunnel 25 which is open at both ends in the feeding mode to allow the birds to have access to the seed 14 which is contained within the feeder body subassembly 17.

A perch structure 26, which detachably depends from the feeder body subassembly 17 at the bottom of the outer bell 22, provides a location at which the birds may sit and have access to the feeding tunnel 25.

Figure 2:
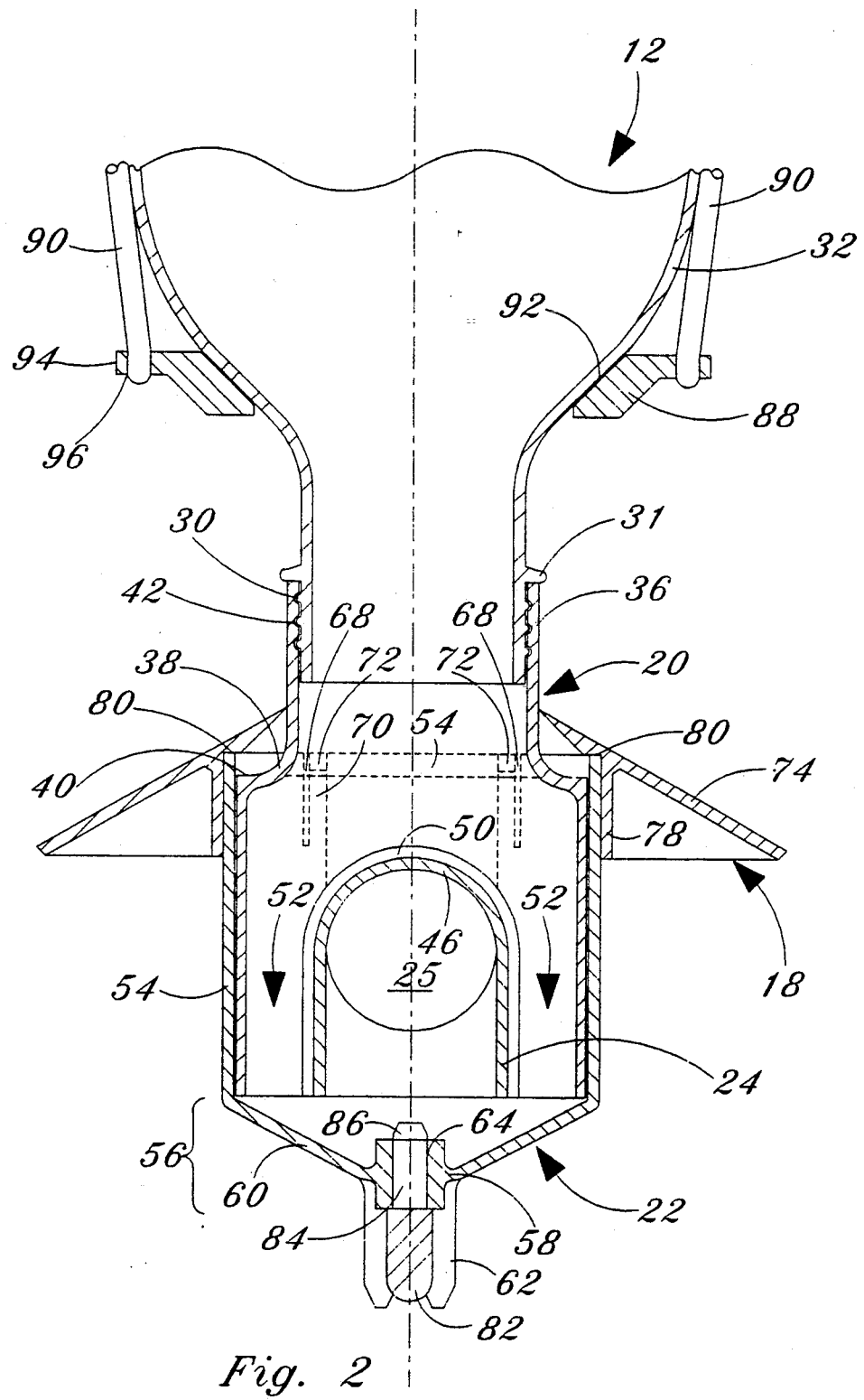
FIG. 2 is a cross sectional view, taken along line 2—2 of FIG. 1, of the preferred embodiment.

As is also illustrated in FIG. 2, the bird feeder assembly 10 is adapted to be utilized in a particular orientation where the central axis 11 is oriented vertically and the seed reservoir 12 is at the top of the structure. This permits the action of gravity on the individual seeds 14 to cause the seed 14 to flow downward into the feeder body subassembly 17. Friction and the shaping of the feeder body 17, particularly the damper 24, restrict the flow to prevent spillage.

Figure 3:
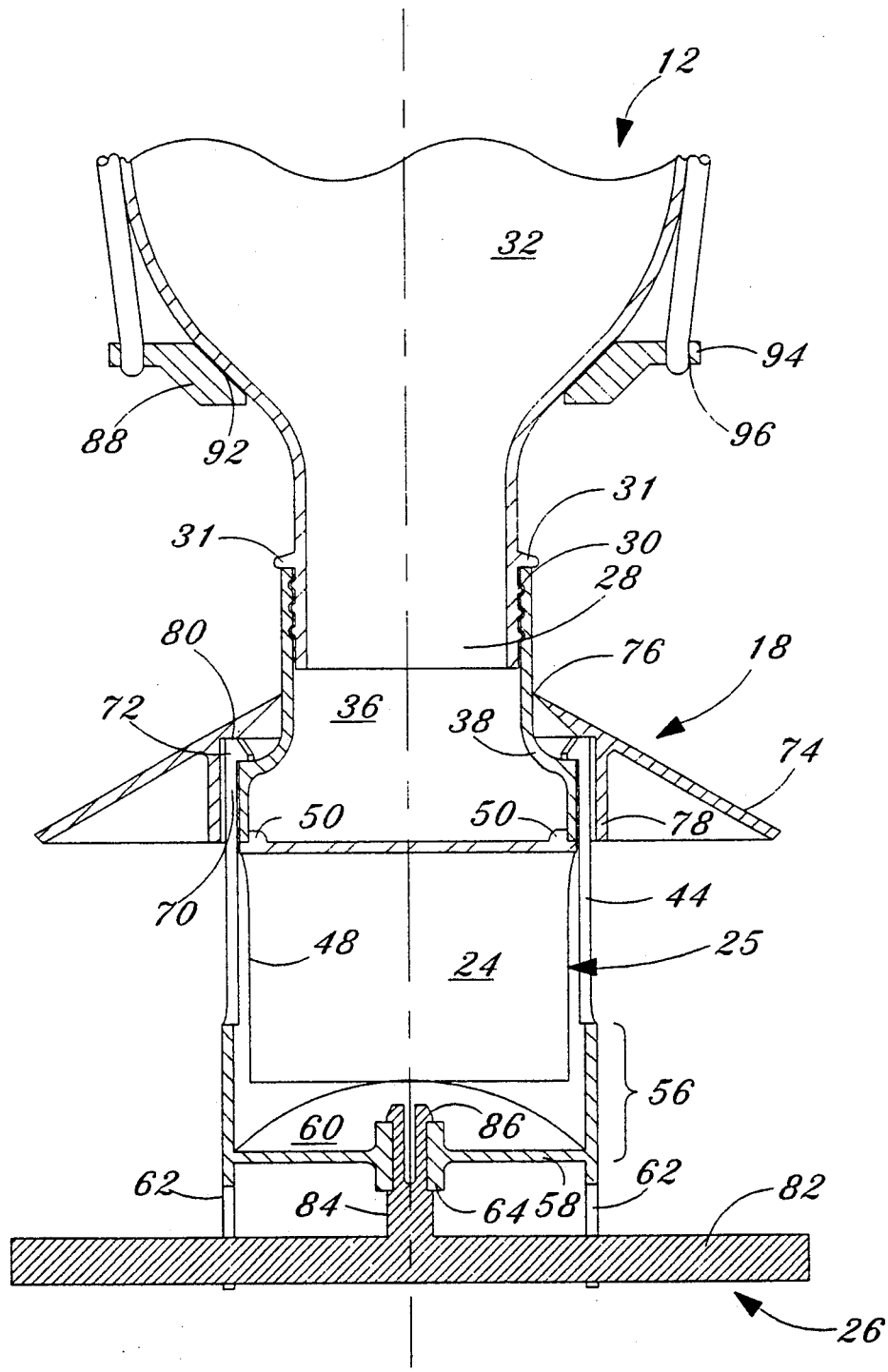
FIG. 3, is a cross sectional view, taken along line 3—3 of FIG. 1 and is similar to that of FIG. 2, but rotated 90° therefrom.

As is shown in FIGS. 1, 2 and 3, the seed reservoir 12 of the preferred embodiment 10 is a modular element such as a common two liter soft drink bottle which the user may fill to whatever level desired with bird seeds 14 or a mixture of similar consistency. The seed reservoir 12 includes a neck opening 28 which, in usage, is oriented downward to mate with the inner bell 20. Surrounding the neck opening 28 is a male cap threading 30 which is the means by which the original bottle cap had been attached to the bottle 12. A neck ridge 31 is formed adjacent to the threading 30. From the neck opening 28, the bottle 12 flares outward to form a bottle body 32. The bottle body 32 is watertight and also provides some vertical shielding to the feeder body assembly 17.

The structure of the feeder body assembly 17 is best illustrated in the exploded view of FIG. 4 with details being found in the cross sectional views of FIGS. 2 and 3. In these illustrations it may be seen that the inner bell 20 has two generally cylindrical portions, a cylinder wall portion 34 and an upper neck portion 36, which are connected by a flaring portion 38 to define an edge ridge 40 along the upper circumferential extent of the cylinder wall portion 34.

The inner bell 20 (also referred to as the upper bell 20) is a circumferential structure which is completely hollow with the interior being featureless except for female threading 42 which is provided in the interior of the upper neck portion 36. The female threading 42 is adapted to mate in a watertight fashion with the male cap threading 30 of the reservoir bottle 12. The bottle 12 is screwed into the inner bell 20 to the extent that the neck ridge 31 abuts against the top of the upper neck portion 36, thus, preventing moisture from entering the feeder body 17 from the top. The threading also holds the feeder body 17 in position.

The cylinder wall portion 34 is provided with a pair of opposed arch apertures 44 which form the ends of the feeding tunnel 25. The arch apertures 44 extend upward from the bottom of the cylinder wall portion 34 to a position downwardly by vertically removed from the edge ridge 40.

The damper 24 is adapted to frictionally fit within the upper bell 20 and to form the roof of the feeding tunnel 25. The damper 24 is adapted to have a central arch roof portion 46 which will extend intermediate the arch apertures 44. The damper 24 effectively has the same cross sectional shape throughout as the arch apertures 44. Curved tunnel edges 48 are formed at the end of the arch roof portion 46 such that the damper tunnel edges 48 will fit snugly just within the arch apertures 44, as is illustrated in FIG. 1. In order to maintain the friction fit, the arch roof portion 46, immediately inside the curved tunnel edges 48, is provided with a pair of retention ridges 50. The retention ridges 50 fit against the interior of the cylinder wall portion 34 immediately surrounding the arch apertures 44. This maintains a frictional fit of the damper 24 within the inner bell 20 and fully defines the upper portion of the feeding tunnel 25. It is noted that, except directly intermediate the arched apertures 44, the damper 24 does not block the interior of the cylinder wall portion. This results in a pair of seed flow channels 52 (see FIG. 2) being defined to the sides of the damper 24, allowing the seeds 14 to flow over and around the side of the damper 24 and downward out of the inner bell 20.

The outer bell 22 is somewhat similar in construction to the inner bell 20 and is adapted to slidably and rotatably mate therewith. The inner bell 20 is adapted to nest within the interior of the outer bell 22. For this reason, the outer bell 22 includes an outer cylinder wall portion 54 which has a slightly greater diameter than the cylinder wall portion 34 of the inner bell 20. In addition to the outer cylinder wall portion 54, the outer bell 22 also includes a feed trough portion 56 at the bottom of the cylinder wall 54. The feed trough portion 56 includes a rectangular base plate 58 and a pair of opposed trough sides 60. The trough sides 60 are inclined as shown in FIG. 2. When the bird feeder 10 is oriented in the feeding mode, as shown in FIG. 2, the trough sides 60 will lie directly beneath the seed flow channels 52, so that the seed 14 may gravitationally feed into the feed trough portion 56. The incline of the trough side 60, and the close proximity to the bottom of the inner bell 20, means that a relatively limited opening is provided which allows friction to prevent the seeds 14 from flowing unchecked into the feed trough 56 to such an extent that they will build up and flow out of the feeder 10 through the feeding tunnel 25.

The outer bell 22 is, in the preferred embodiment 10, an integrally molded structure. It is molded in such a manner that a pair of opposed perch clips 62 depend from the outside edges of the base plate 58. In addition, the base plate 58 is provided with a perch aperture 64. The perch clips 62 and the perch aperture 64 are adapted to mate with the perch structure 26 to secure it to the feeder body subassembly 17 in the appropriate orientation.

The outer cylinder wall 54 is provided with a pair of opposed inverted arch apertures 66. The inverted arch apertures 66 of the outer bell 22 correspond in shape, but in the opposite orientation, to the arch apertures 44 of the inner bell 20. When the wild bird feeder 10 is assembled in the feeding mode, as illustrated partially in the figures, the inverted arch apertures 66 and the arch apertures 44 are oriented to provide circular openings into the feeding tunnel 25. The damper 24 also forms the interior upper edge of the opening to define the feeding tunnel 25. As with the arch apertures 44, the inverted arch apertures 66 are merely in the form of arch-shaped portions of material being absent from the otherwise cylindrical wall portions.

The manner in which the outer bell 22 mates with and is secured to the inner bell 20 is best illustrated in FIGS. 2, 3 and 4. It may be seen that the outer bell 22, in locations slightly circumferentially by spaced from the upper edges of the inverted arch apertures 66, is provided with four flexibility detents 68. The flexibility detents 68 are provided such that the material intermediate one of the flexibility detents 68 and the associated inverted arch aperture 66 forms a spring tab 70. Each of the spring tabs 70 culminates, at its upper extent, in a pawl 72 which is adapted to provide a slidable snap fit over the edge ridge 40 of the inner bell 20, when the outer bell 22 is slidably engaged therewith. It is noted that, as shown in FIG. 3, particularly, the pawl 72 rests on the top of the edge ridge 40 in such a manner that the outer bell 22 may be rotated in an unhindered fashion about the inner bell 20. While the preferred embodiment 10 of the present invention sets forth an inner bell 20 and outer bell 22 which are circular in cross section, variations on this structure are envisioned, which still utilize rotation. Multifaceted polygonal crosssection structures will work particularly well if flexible structural materials are used.

The cover structure 18 is an integrally molded or formed, radially symmetrical structure which provides environmental protection and also acts to inhibit inadvertent disassembly of the feeder body subassembly 17. The cover structure 18 includes a sloping roof portion 74 which extends outward beyond the outside of the outer bell 20 so as to provide shade and light rain protection for the contents and for any birds which may be present on the perch structure 26. The sloping roof 74, in addition to providing environmental protection and esthetic appearance, also acts as an impediment for rodents or other animals which may attempt to reach, from above, the feeding tunnel 25 or birds utilizing the feeder 10. The sloping roof 74 culminates in an interior edge 76 which is adapted to slide onto the upper neck portion 36 of the inner bell 20. It is desired that there be a relatively tight fit between the interior edge 76 and the exterior of the neck portion 36 to minimize seepage into the contents of the feeder body subassembly 17. If a tight sloping fit is obtained any water which does reach the exterior of the upper neck portion 36 would tend to flow outwardly down the sloping roof 74 and to drip harmlessly off.

On the interior surface of the cover structure 18, a retention ring 78 depends downwards from the sloping roof 74. The diameter of the retention ring 78 is selected to be slightly greater than the diameter of the outer cylinder wall 54 of the outer bell 22. Inwardly adjacent to the retention ring 78, the sloping roof portion 74 is provided with a resting detent 80. The resting detent 80 is adapted to rest on the upper edge of the outer cylinder wall 54 so that the cover structure 18 is supported thereon. As is best shown in FIG. 3 and in the phantom illustration of FIG. 2, the retention ring 78 and the resting detent 80 mate with the outer bell 22 in such a manner that the spring tabs 70 are prevented from being deformed radially outward and the pawls 72 are urged into a continuous overlap of the edge ridge 40. In this manner, when the cover structure 18 is slidably engaged with the upper portion of the bells 20 and 22, the secure fit is maintained and there is little or no likelihood that the feeder body subassembly 17 will become inadvertently disassembled.

The interior diameter of the retention ring 78 must be sufficiently large so that the rotation of the outer bell 22 with respect to the inner bell 20 is not unduly inhibited. It is necessary to be able to rotate the bells with respect to one another, so the fit of the cover 18 must not be so tight as to make this difficult. Further, the depth of the retention ring 78 should be limited in such a manner that the cover structure 18 may slide upward on the upper neck cylinder 36 in order to permit manual disassembly, when desired. It is also noted that the diameter of the interior edge 76 is such that it will be blocked from further upward sliding by the neck ridge 31 on the bottle 12.

The perch structure 26 is adapted to mate with the outer bell 22 to provide a resting location for birds to stand while feeding within the feeding tunnel 25. The perch structure 26 includes a perch rod 82 which extends beneath the base plate 58 and is captured within the perch clips 62. A mounting post 84 extends perpendicularly from the center portion of the perch rod 82. The mounting post 84 is provided with securing prongs 86 such that when the mounting post 84 is inserted into the perch aperture 64, the securing prongs 86 will snap into position and hold the perch rod 82 securely in place. The multiple attachment provided by the perch clips 62 and the perch aperture 64 provide reasonable assurance that birds of suitable weight may perch comfortably and securely on the ends of the perch rod 82 with easy access to the feeding tunnel 25. Although the preferred embodiment 10 shows the perch structure 26 as being a detachable portion of the invention, this is primarily for ease of manufacture and there is no exigent reason why the perch structure 26 may not form an integral portion of the outer bell 22.

Although it is conceivable that the wild bird feeder assembly 10 may be mounted in a variety of manners, the preferred hanger structure 16 illustrated in FIG. 1 provides one method by which the structure may be suspended so as to hang properly along the vertical axis 11. The hanger structure 16 of the preferred embodiment includes a hanger ring structure 88 which is held in position about the flaring portion of the bottle 12 by suspension cords 90. The hanger ring 88 includes a tapered interior surface 92 and a circumferential flange 94. The flange 94 provided with a plurality of cord apertures 96 through which the suspension cord 90 may be threaded so as to suspend the hanger ring 8a. The tapered interior surface 92 of the hanger ring 88 is adapted to slidably fit over the neck portion 28 of the reservoir 12 and to form a secure 360° supporting abutment with the flaring portion of the bottle 12. The weight of an even partially filled seed reservoir 12 will force the bottle downward into the tapered interior surface 92 to provide firm support.

The flange 94 is provided with as many of the cord apertures 96 as are desired. In the preferred embodiment 10, the flange 94 is provided with four radially spaced cord apertures 96. This allows either the attachment of four independent cords 90 or, as shown in the drawing, two suspension cords 90, with each being threaded through two of the cord apertures 96. The cords 90 extend upward to form a kind of radially surrounding basket about the seed reservoir 12 (as may be seen partially in FIG. 1). The action of the radially separated cords 90 forming the basket about the seed reservoir 12 helps to inhibit tipping of the feeder 10 in the event that it becomes unbalanced by uneven weight distribution or by wind conditions.

Alternative hanger structures 16 may be desirable. For example, a rigid lattice extending radially outward from the hanger ring 88 might provide greater stability. Further, an attachment to the end of the reservoir bottle 12 which is situated opposite the neck opening 28 would be effective in avoiding overbalancing problems which may be caused by a loaded seed reservoir 12. Further, a stability ring or the like which may be mounted at a portion partially up the sides of the seed reservoir 12 may further prevent tipping. Many different types of hanger structures 16 are suitable, so long as good suspension support and balance are provided. Further, the hanger structure 16 must be selected to permit easy detachability for refilling and relocation.

Figure 5:
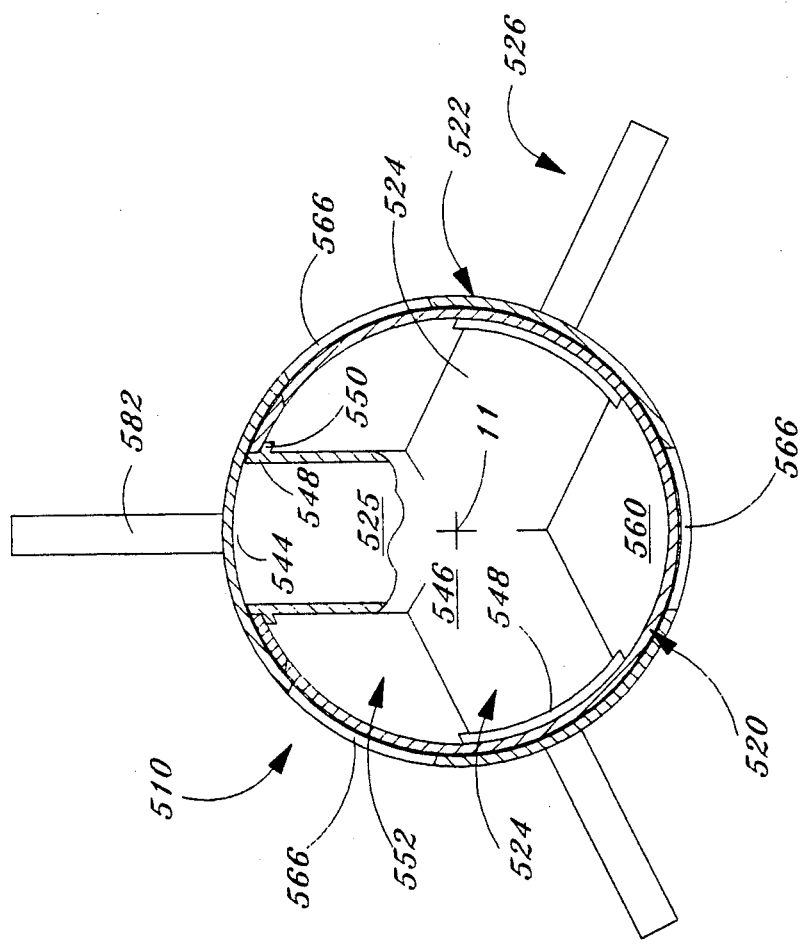
FIG. 5 is a cross sectional view of an alternate embodiment of the present invention taken along a horizontal plane lying just above the apex of the damper structure.

An alternate embodiment of the present invention is illustrated in FIG. 5. This illustration is a cross section taken by selecting a horizontal plane lying slightly above the apex of the damper structure and looking downward along the central axis 11. The alternate embodiment, which is designated by the general reference character 510, is in many respects similar to the preferred embodiment 10 illustrated in the other figures. To this end, components which are identical to those appearing in the preferred embodiment will be referred to again with the same reference number. Components which are similar in function but slightly modified in the alternate embodiment 510 will be referred to by reference numbers incorporating the original reference, with an initial digit "5" added.

The illustration of FIG. 5 is shown with the alternate feeder 510 being presented in the closed or storage mode. In addition, the alternate embodiment 510 is illustrated as having three entrances to the feeder tunnel 525, as opposed to the two entrances of the preferred embodiment 10. The use of an odd number of arch openings 544 and 566 minimizes the potential of straight through wind passages which can disturb the seed 14.

In the illustrations of FIG. 5 it may be seen that the alternate damper 524 includes three tunnel edges 548 radially extending out from the central arched roof 546. In the illustrations of FIG. 5, one of the tunnel edges 548 is partially cut away to illustrate the bottom of the arch aperture 544.

It may be seen that, like in the preferred embodiment 10, the damper 524 is secured within the inner bell 520 by the friction fit and preload which forces the retention ridges 550 against the interior of the arch apertures 544.

Since the alternate embodiment 510 has three access openings into the feeding tunnel 525, this also necessarily modifies the perch structure 26 in order to provide perching locations for birds wishing to utilize the feeder 510. The relevant portions of the alternate perch structure 526 are illustrated in FIG. 5. It is understood that the outer bell 520 will be modified on its lower extent in order to accommodate the alternate perch structure 526.

The number of openings into the feeding tunnel may be selected according to the requirements of the user and manufacture. However, as shown in FIG. 5, it is sometimes desirable to utilize an odd number of apertures in order to minimize the danger of wind passing through, and also to slightly minimize the interaction of birds which are feeding. Care must be taken, however, to make certain that sufficient seed flow channels 552 are maintained so that the supply of seed 14 in the feed trough portion 56 will not be unduly depleted.

The preferred embodiment of the present invention 10 and 510 which are illustrated in the drawing and described above is expected to be constructed almost exclusively of lightweight plastic. The components of the feeder body subassembly 17 can be constructed of relatively flimsy materials since they need not support a substantial amount of weight. The type of birds which ordinarily would utilize a feeder assembly such as this will not be so heavy that their weight will be likely to damage the structure.

Further, the particular embodiments 10 and 510 illustrated in the drawings are adapted to be utilized with the standard one liter or two liter plastic soft drink bottles which are readily available in the United States. To this end, it may be seen that the size of the structure is relatively small, and that the total effective diameter of the feeder body subassembly 17 is not much larger than the diameter of the neck of the bottle 12. This is appropriate because the type of birds which are intended to be fed are relatively small and a feeder opening having a diameter of 1.12 cm (0.438 in) is sufficient. For this purposes of this embodiment 10, the preferred dimensions are approximately 5.08 cm (2.00 in) diameter for the outer bell 22, with the arch apertures 44 and inverted arch apertures 66 having a width of approximately 2.22 cm (0.875 in). When the feeder 10 is assembled, the effective diameter of the opening into the feeding tunnel 25 is 1.12 cm (0.438 in) and the perch rod 82 has a total length of 12.7 cm (5.00 in).

The above structure is adapted for utilization by relatively small birds, such as sparrows and smaller song birds. If a larger class of bird is the target audience, then larger dimensions and sturdier materials may be required. For many purposes, however, it would be undesirable to create too large or sturdy of a structure, for in that event larger and more aggressive birds, such as jays and crows, may tend to monopolize the feeder and prevent its intended use.

Modification of the cross sectional shape of the bell members may also be desirable. For example a multifaceted polygonal shape may allow ratcheted turning action with multiple preferred rotational positions. This may be desirable in avoiding unwanted rotation.

Various other modifications and alterations of the dimensions, materials, orientation and usages may be made without departing from the invention. Those skilled in the art will readily recognize that any number of openings may be added provided they are arranged to overlap when the inner bell is rotated. Accordingly, the above disclosure is not to be considered as limiting and the appended claims are to be interpreted as encompassing the entire spirit and scope of the invention.

INDUSTRIAL APPLICABILITY

The inventive bird feeder 10 is adapted as an all season feeder for birds or other animals. The bird feeder 10 has an open mode and a closed mode. In the open mode the bird feeder 10 provides a steady supply of seed 14, fed by gravity and regulated by the damper 24. With a simple twist the bird feeder 10 is changed to the closed mode for weather protection, transport, storage, or reservoir 12 changes. The bird feeder 10 can be hung or mounted outdoors in known bird habitats by many variations of a hanger element 16. In favorable weather the bird feeder 10 is rotated into the open mode in order to attract and feed the birds. The birds can perch on the provided perching structure 26 where they can access the seed 14. The bird feeder 10 is very mobile and so can be moved at any time to a better location. In foul weather the bird feeder 10 is closed with a simple twisting action after which it can remain subjected to the elements or be stored for a later date. In either case the seeds remain safe and secure within the bird feeder 10.

It is anticipated that the bird feeder 10 will utilize common glass or plastic beverage containers as seed reservoirs 12. The containers would be rinsed and dried, filled with seed, then attached to the bird feeder 10 where compatible threading is provided. In addition, the basic structure can be adorned with any variety of decorative attachments or overlays to suit those bird lovers who prefer alternate outward appearances for esthetic reasons.

In order to use the wild bird feeder assembly 10, the user will first assemble the feeder body 17. This is easily accomplished by frictionally fitting the damper 24 into the inner bell 20 such that the retention ridges 50 abut firmly against the interior of the cylinder wall portion 34 directly about the arch apertures. The damper is formed such that it must be slightly deformed to achieve this fit, so material preloading prevents inadvertent disassembly.

The outer bell 22 is provided with the perch attachment 26, which is held in position by the snap fit of the perch clips 62 about the perch rod 82 and the securing prongs 86 against the base plate 58 about the perch aperture 64.

The mating of the bells is accomplished by sliding the outer bell 22 over the inner bell 20 until the pawls 72 snap into position over the edge ridge 40. The cover 18 is then slid into position over the upper neck portion 36 until the retention ring 78 surrounds the edge ridge 40 and the resting detent abuts against the top of the outer cylinder wall 54. It is noted that, in the preferred embodiment 10, the lower edge of the inner cylinder wall 34 will rest upon a portion of the trough sides 60, thus providing a limitation to the degree of overlapping of the bells.

Once the feeder body subassembly 17 is fully assembled, it is oriented in the closed mode by turning the bells with respect to one another until there is no overlapping alignment between the arch apertures 44 and the inverted arch apertures 66. It is then attached to the seed reservoir 12. The seed reservoir 12 should be prefilled with seed 14 to the desired level and the hanger structure 16 installed with the hanger ring 88 in place about the neck of the bottle 12. With the neck opening 28 facing upward to prevent spillage, the female threads 42 are mated with male threads 30 until the upper neck 36 abuts against the neck ridge 31. The entire assembly is then inverted to gravitationally urge the seeds 14 to flow into the feed trough 56. The hanger structure 16 is attached to an overhang and the feeder body 17 is converted to the open mode by turning the outer bell 22 until the arch openings 44 and 66 are aligned and the feeding tunnel 25 is presented to the birds.

When a bird wishes to feed at the feeder 10, it will ordinarily perch on the perch rod 82 and place its head into the feeding tunnel 25. The bird will use its beak to acquire seeds 14 from the feed trough portion 56 until it is satisfied. The removal of seeds 14 from the feed trough 56 will lessen the frictional/hydrostatic force and allow additional seeds 14 to flow downward through the flow channels 52 to replenish the supply. In the event of blockage, jostling the structure and rotating the outer bell 22 will ordinarily restore flow. The facts that the head of the bird is inside the feeder body 17 and level of seeds 14 in the feed trough 56 is maintained below the bottom of the inverted arch apertures 66 minimize the loss of seeds 14 during normal vigorous feeding.

When inclement weather threatens, when it is time to change seed reservoirs 12, or when it is appropriate to move the feeder 10 to a new location, loss of contents is prevented by converting to the closed mode before undertaking the operation. In this manner, a supply of dry seeds is maintained with minimized effort and inconvenience for the user.

While the preferred embodiment of the present invention sets forth a feeder for birds, the same feeder design is equally applicable to other animals, such as squirrels, raccoons, and even deer. Such a feeder design would be equally appropriate for dispensing poisoned food aimed at eliminating undesirable rodents. In such an application the closed mode would prevent domestic animals from consuming the poison. In any event, all that is required is a corresponding adjustment in the size of the feeder 10, different mounting structures, and a new damper 24 to provide the correct flow rate according to type of contents.

In light of the above described aspects and advantages of the present invention, it is expected that the bird feeder 10 will have a substantial demand in the marketplace. While many types of feeders are available, none have the easy to use weather-proof design of the inventive bird feeder 10 set forth herein. Accordingly, it is expected that the present invention will enjoy immediate, long lasting and widespread industrial applicability and commercial utility.

I claim:

1. A wild bird feeder, for delivering bird seed in a controlled manner to flying creatures, comprising:
    a detachable seed reservoir for holding bird seed, said seed reservoir including attachment means at a lower extent thereof;
    support means for supporting the seed reservoir in a hanging orientation;
    a hollow upper component, including:
        mating means for attaching to the attachment means to secure said upper component to said seed reservoir; and
        cylindrical wall means having a plurality of peripheral window means formed therein, and being open to the bottom;
    a damper member disposed within said upper component so as to form therewith the upper extent of a feeding tunnel, with seed flow channels being defined intermediate said damper member and the interior of the cylindrical wall means, said damper member having a curved upper surface and a plurality of tunnel edges, equal to the plurality of the peripheral window means, each tunnel edge adapted to mate with one of the peripheral window means; and
    a hollow lower component adapted to mate with said upper component in a nested fashion, said lower component and said upper component being axially and radially secured together, but being mutually respectively capable of rotation, said lower component including;
        enclosing wall means surrounding a hollow interior, the enclosing wall means being open to the top and being provided with a plurality of openings, the openings corresponding in number to, having approximately the same width as, and being correspondingly radially spaced with, the peripheral window means of said upper component;
        floor means disposed beneath the openings, to form a trough portion into which bird seed may flow through the flow channels and be retained therein; and
        latching means for releasably attaching said lower component to said upper component.

2. The bird feeder according to claim 1, wherein the plurality of the peripheral window means is selected to be n, and the width of each peripheral window means is no greater than ½n of the total circumference of the cylindrical wall means.

3. The bird feeder according to claim 2, wherein n is selected to be an odd positive integer to minimize direct wind flow paths through the feeding tunnel.

4. The bird feeder according to claim 1, and further including
    a cover structure extending as a roof over said upper component so as to provide protection to tunnel openings which are formed at the ends of the feeding tunnel when the peripheralwindow means are aligned with corresponding openings.

5. The bird feeder according to claim 1, wherein the smaller diameter component of said upper component and said lower component is provided with a circumferential engagement ridge; and
    the larger diameter component of said upper component and said lower component includes spring prongs having pawls formed at the end thereof to engage the engagement ridge, to detachably secure said upper component and said lower component together, while not interfering with the mutual rotation.

6. The bird feeder according to claim 1, wherein said damper member is deformable so as to form a secure friction fit with said upper component.

7. The bird feeder according to claim 1, wherein said seed reservoir is a bottle having a neck portion and a body portion; and said support means includes a ring member adapted to slidably fit over the neck portion and support cords for extending from the ring member.

8. The bird feeder according to claim 1, and further including
a perch attachment secured to said lower member, the perch attachment having a perching location corresponding to each of the openings in the enclosing wall means of said lower component.

9. A device for feeding animals comprising:
an outer bell including a feed trough and an outer wall, the feed trough disposed perpendicularly to a longitudinal central axis, the outer wall disposed about the central axis, extending upward from the feed trough, terminating in a top rim, and having a plurality of inverted arch apertures formed therein;
an inner bell rotatably mated within said outer bell, said inner bell including a reservoir attachment and an inner bell wall, the inner bell wall depending downward from the reservoir attachment and being disposed about said central axis within the outer wall, the inner wall having a plurality of arch apertures formed therein;
a feed reservoir for disposing feed above said inner bell, said feed reservoir attached to said inner bell at the reservoir attachment, said feed reservoir containing flowable food material which is caused by gravity to feed into said inner bell through the reservoir attachment;
a damper disposed within said inner bell, said damper extending between the arch apertures and forming a plurality of flow paths intermediate said damper and the inner bell wall, said damper causing the feed flowing from the reservoir attachment to flow through said flow paths out of said inner bell into the feed trough of said outer bell, said damper stopping the feed from flowing at a level below the inverted arch apertures of said outer bell by the action of hydrostatic and frictional forces on the feed; and
a hanging structure surrounding said feed reservoir for suspending said feed reservoir in the air from a fixed point;
wherein said inner bell and said outer bell rotate relative to each other about the central axis to be arrayed in at least an open mode and a closed mode, the arch apertures aligning with the inverted arch apertures in the open mode to provide access to the feed in the feed trough, the arch apertures aligning with the outer wall and the inverted arch apertures of said inner bell aligning with the inner bell wall in the closed mode to isolate the feed within the inner and outer bells.

10. A device for feeding animals according to claim 9, and further including
a perch depending from said outer bell, said perch being aligned with the inverted arch apertures.

11. A device for feeding animals according to claim 9, wherein
when said outer bell and said inner bell are arrayed in the open mode, the corresponding arch apertures and inverted arch apertures align to form generally circular openings into a feeding tunnel, the circular openings being sufficiently large so as to allow the entry of the heads of a desired animal.

12. A device for feeding animals according to claim 9, wherein
the plurality of the arch apertures is equal to the plurality of the inverted arch apertures, and
each arch aperture is separated from each adjacent arch aperture by an extent of said inner bell wall having a radial arc at least as great as the radial arc of the width of the widest of the inverted arch apertures.

13. A device for feeding animals according to claim 9, and further including
securing means for securing said inner bell to said outer bell in a manner such that said outer bell may be rotated completely about said inner bell, while maintaining the same relative axial position with respect thereto.

14. A device for feeding animals according to claim 13, wherein the securing means includes
an engaging ridge is formed circumferentially about said inner bell; and
a plurality of spring arm members disposed axially about the inverted arch apertures, each spring arm terminating in a pawl, each pawl being adapted to engage the engaging ridge in a detachable manner.

15. A device for feeding animals according to claim 9, and further including
a cover member for disposing over a portion of said inner bell so as to provide a roof extending radially beyond the extent of said inner bell.

16. A device for feeding animals according to claim 14, and further including
a cover member for disposing over a portion of said inner bell so as to provide a roof extending radially beyond the extent of said inner bell, the cover member including a retaining portion for slidably fitting about the pawls and the engaging ridge, such that when the cover member is in place, the pawls are prevented from becoming detached from the engaging ridge.

17. In a bird feeder device depending from a reservoir of gravitationally fed pellet-like feed, the improvement comprising:
forming an upper component which is secured to the reservoir so as to be stationary with respect thereto, said upper component including a plurality of circumferential apertures;
forming a lower component circumferentially nesting with said upper component, said lower component and said upper component axially overlapping to a fixed degree to form a feeding trough therewithin, said lower component including a plurality of circumferential openings, and
providing a damper member is provided within the interior of said upper component to prevent direct flow of the pellet-like feed to the circumferential apertures,
wherein said upper component and said lower component are adapted to be arrayed in at least an open mode in which the circumferential aperture overlaps any circumferential opening and the feed through is isolated from the exterior of the bird feeder device.

18. The improvement according to claim 17, wherein the number of circumferential apertures and the number of circumferential openings is equal, and
the circumferential are equally radially disposed about the upper component.

19. The improvement according to claim 17, wherein
a cover structure is provided so as to form a protective roof extending over said upper component.

* * * * *